United States Patent [19]

Yoshimura

[11] Patent Number: 5,712,846
[45] Date of Patent: Jan. 27, 1998

[54] ORDER WIRE COMMUNICATION CONTROL METHOD FOR LINE-SWITCHED RING NETWORK SYSTEM

[75] Inventor: Masatoshi Yoshimura, Tokyo, Japan

[73] Assignee: NEC Corporation, Tokyo, Japan

[21] Appl. No.: 576,376

[22] Filed: Dec. 21, 1995

[30] Foreign Application Priority Data

Dec. 21, 1994 [JP] Japan ................................. 6-317393

[51] Int. Cl.$^6$ ............................................. H04L 12/24
[52] U.S. Cl. ........................... 370/226; 370/243; 370/248
[58] Field of Search ........................ 370/16, 16.1, 85.15, 370/13, 85.5, 216, 225, 226, 227, 228, 241, 242, 243, 246, 248; 340/825.5, 826, 827; 395/180, 181, 182.01, 182.02; 375/211, 212, 213

[56] References Cited

U.S. PATENT DOCUMENTS

| | | | |
|---|---|---|---|
| 5,159,595 | 10/1992 | Flanagan et al. | 370/85.15 |
| 5,278,824 | 1/1994 | Kremer | 370/16.1 |
| 5,341,364 | 8/1994 | Marra et al. | 370/16.1 |
| 5,365,510 | 11/1994 | Nicholson et al. | 370/16 |
| 5,412,652 | 5/1995 | Lu | 370/85.15 |
| 5,442,620 | 8/1995 | Kremer | 370/16.1 |

OTHER PUBLICATIONS

Sonet Transport Systems: Common Criteria Network Element Architectural Features, GR–253–Core, Issue 2, Dec. 1995, pp. 5–26.

Sonet BLSR Equip. Generic Criteria "Definitions, Terminology, and Common Phrases", and Overview of the BLSR Architecture, GR–1230–Core, Issue 2, Nov. 1995, pp. 2–1 to 2–12 and 3–1 to 3–23.

*Primary Examiner*—Hassan Kizou
*Assistant Examiner*—Kwang Bin Yao
*Attorney, Agent, or Firm*—Sughrue, Mion, Zinn, Macpeak & Seas, PLLC

[57] ABSTRACT

In an order wire communication control method in a bidirectional line-switched ring network system, two line terminalends located at both sides of faulty location transmit failure occurrence information utilizing APS bytes of APS protocol to other line terminalend in response to occurrence of failure in an order wire communication path on the ring network. The line terminalend where the order wire is terminated is released from termination in response to reception of the failure occurrence information of the APS bytes. Then, one of two line terminalends at both sides of the faulty location, commands termination of the order wire for the line repeater located closest to the faulty location among a plurality of line repeaters under control thereof. Thus, after release from failure, terminating control of the order wire becomes unnecessary to make it possible for all of the line terminalend to perform order wire communication.

8 Claims, 10 Drawing Sheets

| | APS K1 BYTE | | APS K2 BYTE | |
|---|---|---|---|---|
| | CONDITION | DESTINATION NODE ID | SOURCE NODE ID | |
| a1 | NR | N2 | N1 | |
| a2 | NR | N4 | N1 | |
| b1 | NR | N3 | N2 | |
| b2 | NR | N1 | N2 | |
| c1 | NR | N4 | N3 | |
| c2 | NR | N2 | N3 | |
| d1 | NR | N1 | N4 | |
| d2 | NR | N3 | N4 | |

| | APS K1 BYTE | | APS K2 BYTE | |
|---|---|---|---|---|
| | CONDITION | DESTINATION NODE ID | SOURCE NODE ID | |
| $a_1$ | SFR | N 2 | N 3 | |
| $a_2$ | SFR | N 3 | N 2 | |
| $b_1$ | SFR | N 3 | N 2 | |
| $b_2$ | SFR | N 3 | N 2 | |
| $c_1$ | SFR | N 2 | N 3 | |
| $c_2$ | SFR | N 2 | N 3 | |
| $d_1$ | SFR | N 2 | N 3 | |
| $d_2$ | SFR | N 3 | N 2 | |

| R | RESPONSE |
|---|---|
| R31 | PRESENT |
| R32 | PRESENT |
| R33 | PRESENT |
| ⋮ | ⋮ |
| ⋮ | ⋮ |
| R34 | PRESENT |
| R35 | ABSENT |
| R36 | ABSENT |
| R37 | ABSENT |

NO RESPONSE FOR FAILURE

ORDER WIRE COMMUNICATION CONTROL METHOD FOR LINE-SWITCHED RING NETWORK SYSTEM

BACKGROUND OF THE INVENTION

1. Field of the Invention

The present invention relates generally to an order wire communication control method for a line-switched ring network system. More specifically, the invention relates to a terminal control method for an order wire in a ring network system which enables bidirectional communication and includes an order wire for order communication between a plurality of line terminal ends, between the line terminal ends and a plurality of line repeaters provided between the line terminal ends, and in which the order wire is terminated in one line terminal ends.

2. Description of the Related Art

Conventionally, on this kind of bidirectional ring network, an order wire communication line is set. The order wire is adapted to be used as a communication line for ordering communication between a plurality of line terminal ends.

Figure 11:
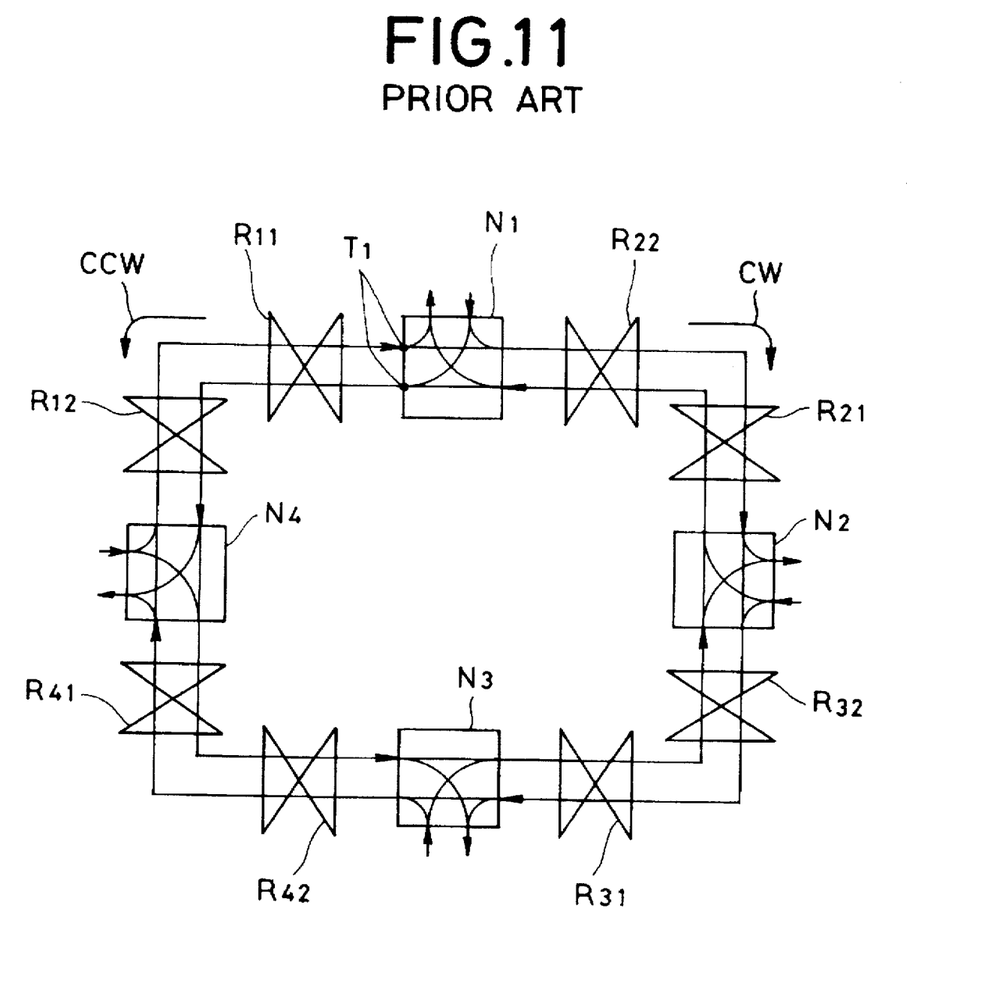
FIG. 11 is a block diagram for explaining the conventional ring network system.

A general construction of such bidirectional ring network has been illustrated in FIG. 11. In FIG. 11, the line-switched ring network offers services of communication in clockwise direction CW and counterclockwise direction CCW. The order wire is set on this ring network. A plurality of line terminal ends (hereinafter simply referred to as nodes) N1 to N4 are provided on the ring network. For ordering communication between these nodes, the order wire is used.

It is typical to provide a plurality of line repeaters between respective nodes. In FIG. 11, the line repeaters R21 and R22 are provided between the nodes N1 and N2. The line repeaters R31 and R32 are provided between the nodes N2 and N3. The line repeaters R41 and R42 are provided between the nodes N3 and N4. The line repeaters R11 and R12 are provided between the nodes N4 and N1.

It should be noted that the line repeaters R21 and R22 between the nodes N1 and N2 are controlled by the node N2. It is assumed that respective line repeater is controlled by the closest nodes in the clockwise direction CW.

In the order wire communication system on the line-switched ring network system constructed as set forth above, the order wire communication system does not work in the case where looping of the communication content is formed. Furthermore, in that case, it is a cause of howling. Therefore, for avoiding looping of the communication content in the network, it becomes necessary to establish a one-way communication path terminating one end at a certain node. Therefore, in the example of FIG. 11, both of clockwise communication and counterclockwise communication are terminated at the node N1 (shown as T1).

Figure 12:
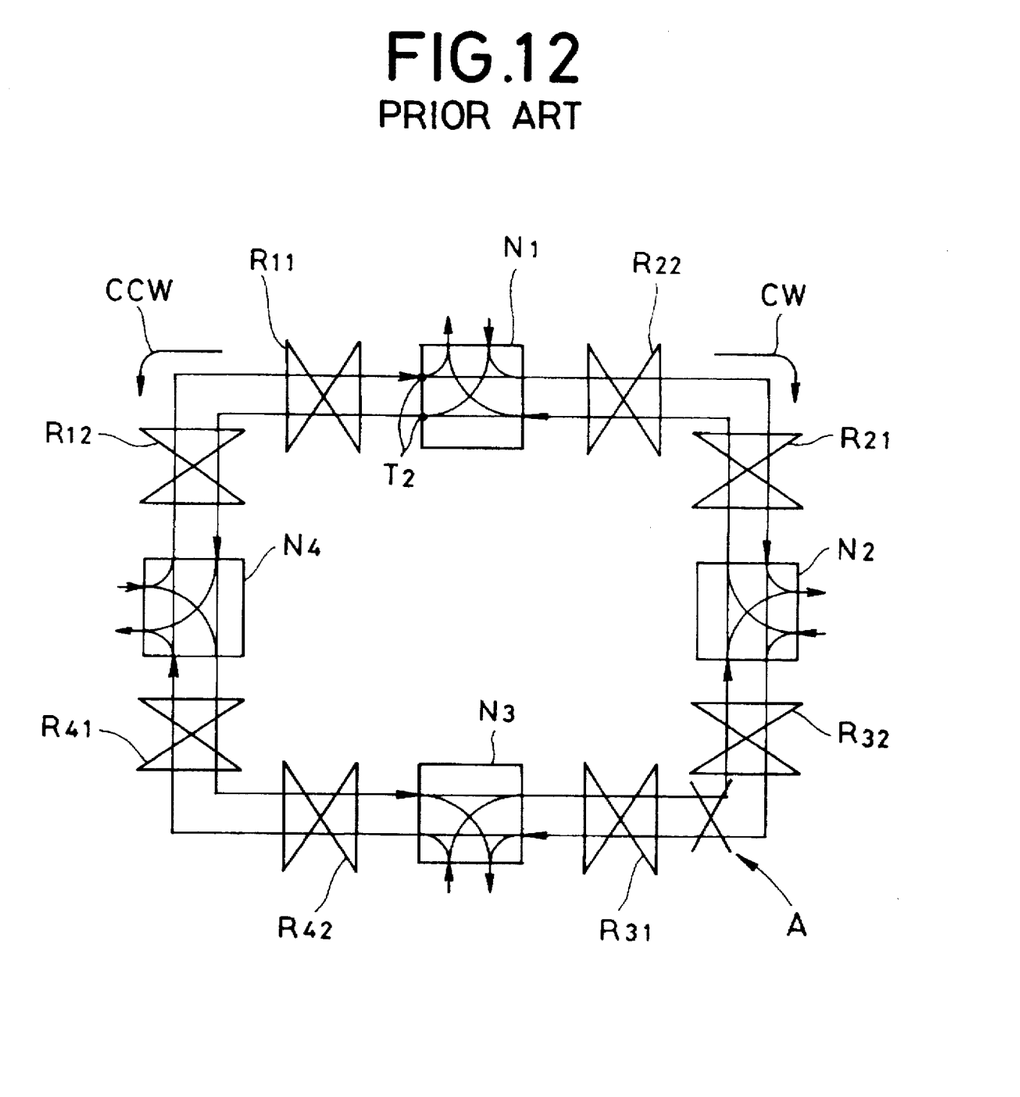
FIG. 12 is an illustration showing a location where the communication system has a failure, in the block of FIG. 11.

Here, as shown in FIG. 12, when the communication system has failure at a location between the line repeaters R31 and R32 as indicated by A, a procedure for automatic recovery by Automatic Protection Switching Protocol called as APS protocol is provided for a line for main signal. Therefore, failure at any location on the network can be recovered.

However, in the conventional order wire communication control, when the order wire communication failure is caused, there is no way to automatically resume the order wire communication since a procedure for automatic recovery like the APS protocol for the main signal is not present. Accordingly, in the conventional system, when a failure as illustrated in FIG. 12 is caused, only the order wire communication in the range between the node N1 and the line repeater R32 and the order wire communication in the range between the line repeaters R31 and R11 are possible, and order wire communication through the overall ring network becomes impossible.

Therefore, in the prior art, when the order wire path failure is caused, the terminating control of the termination point (T1) in the order wire communication on the network is replaced to the other suitable location by manual control to re-establish the path for enabling order wire communication. Furthermore, when failure in the order wire path recovers, since the terminal point has already released and thus is not present, it becomes necessary to perform terminating control with setting an arbitrary point on the network as terminal point, again.

SUMMARY OF THE INVENTION

It is an object of the present invention to provide an order wire communication control method in a ring network-system, which enables automatic recovery of order wire communication upon occurrence of failure in a transmission path.

According to one aspect of the invention, an order wire communication control method in a ring network system including a plurality of line terminal ends, a plurality of line repeaters respectively provided between the line terminal ends, a pair of communication lines connecting these line terminal ends and the line repeaters in a ring form for bidirectional data communication, and bidirectional order wires respectively set on the pair of communication lines and terminated on one line terminal end for ordering communication between the line terminal ends, comprises:

a first step of transmitting failure occurrence information indicative of an occurrence of a failure utilizing an automatic protective switching protocol from two adjacent line terminal ends at both sides of the location where failure is caused, in response to the occurrence of a failure at the faulty location on the ring network, via said bidirectional order wire;

a second step of automatically releasing termination of the bidirectional order wire in response to reception of the failure occurrence information in one line terminal end; and a third step of automatically designating termination of the bidirectional order wire with respect to a line repeater positioned at closest position of the faulty location from one of first and second line terminal ends adjacent the faulty location.

In the first step, the first and second line terminal ends may trigger the automatic protective switching protocol in response to occurrence of failure to insert the failure occurrence information in an APS byte used in the protocol for transmission. In such case, each of the plurality of line terminal ends includes a step of transmitting the APS byte received from preceding stage of line terminal end to the next stage of line terminal end.

The first line terminal end may control a plurality of line repeaters located between the first and second line terminal ends, and, in the third step, the first line terminal end may command for the termination of the bidirectional order wire to establish the termination of the order wire at the closest one of the line repeaters with respect to the faulty point among the line repeaters under control.

Preferably, the third step comprises:

a step for sequentially transmitting an access command from the first line terminal end for a plurality of line repeaters under control in order from the closet line terminal end, a step for detecting response to the access command from the line repeaters, and a step for detecting the line repeater located at closest position of the faulty location depending upon presence and absence of the response.

In this case, in the line repeater detecting step, the line repeater immediately preceding to the line repeater, for which detection of the response is failed, may be identified as the closest line repeater to the faulty location. Also, the order wire communication control method may further include a step of registering the presence and absence of the response in a response queue in order, and in the line repeater detecting step, one of the line repeaters is identified as the line repeater closest to the faulty location. The line repeater corresponding to the stored data in the response queue immediately preceding a variation in the stored data from that indicative of presence of the response to that indicative of absence of the response, may be identified as the line repeater closest to the faulty location.

BRIEF DESCRIPTION OF THE DRAWINGS

The present invention will be understood completely from the detailed description given here below and from the accompanying drawings of the preferred embodiment of the invention, which, however, should not be taken to be limiting to the present invention, but are for explanation and understanding only.

In the drawings.

DESCRIPTION OF THE PREFERRED EMBODIMENT

The present invention will be discussed hereinafter in detail with reference to the accompanying drawings. In the following description, numerous specific details are set forth in order to provide a thorough understanding of the present invention. It will be obvious, however, to those skilled in the art that the present invention may be implemented without the specific details. In other instances, well-known structures are not shown in detail in order to prevent unnecessarily obscured the present invention.

Figure 1:
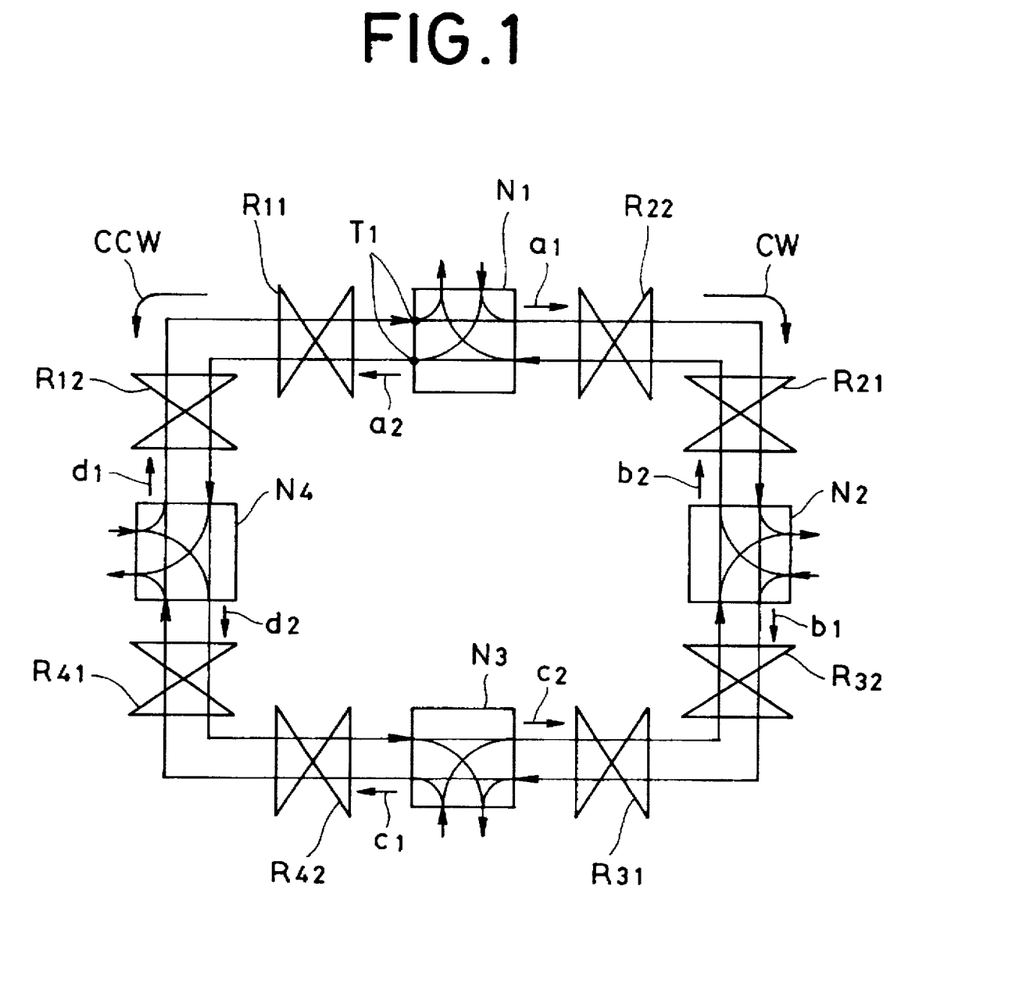
FIG. 1 is a block diagram showing a ring network system, in which the preferred embodiment of an order wire communication control method according to the present invention is applied.

FIG. 1 is a block diagram showing general construction of a ring network system, for which the preferred embodiment of the order wire communication control method according to the present invention is applied. In FIG. 1, same elements as those of FIGS. 11 and 12 are represented by the same reference numerals. In FIG. 1, each node is preliminarily assigned a node ID (a specific number for identifying the node, namely an address number). Here, the node IDs for respective nodes illustrated in FIG. 1 are assumed to be "N1", "N2", "N3" and "N4".

With respect to a line repeater between two nodes, all of the line repeaters presenting in the counterclockwise direction CCW from a certain node are objective stations for remote operation by the node, and a terminating control can be done by the remote operation. For example, the line repeaters R31 and R32 present between the nodes N3 and N2 are under management control of the node N3 and the objective stations for remote operation of the node N3.

It should be noted that, in the node N1, the termination of the order wire is set at a point T1 in the counterclockwise direction CCW similarly to the example of FIG. 11.

Figure 2:
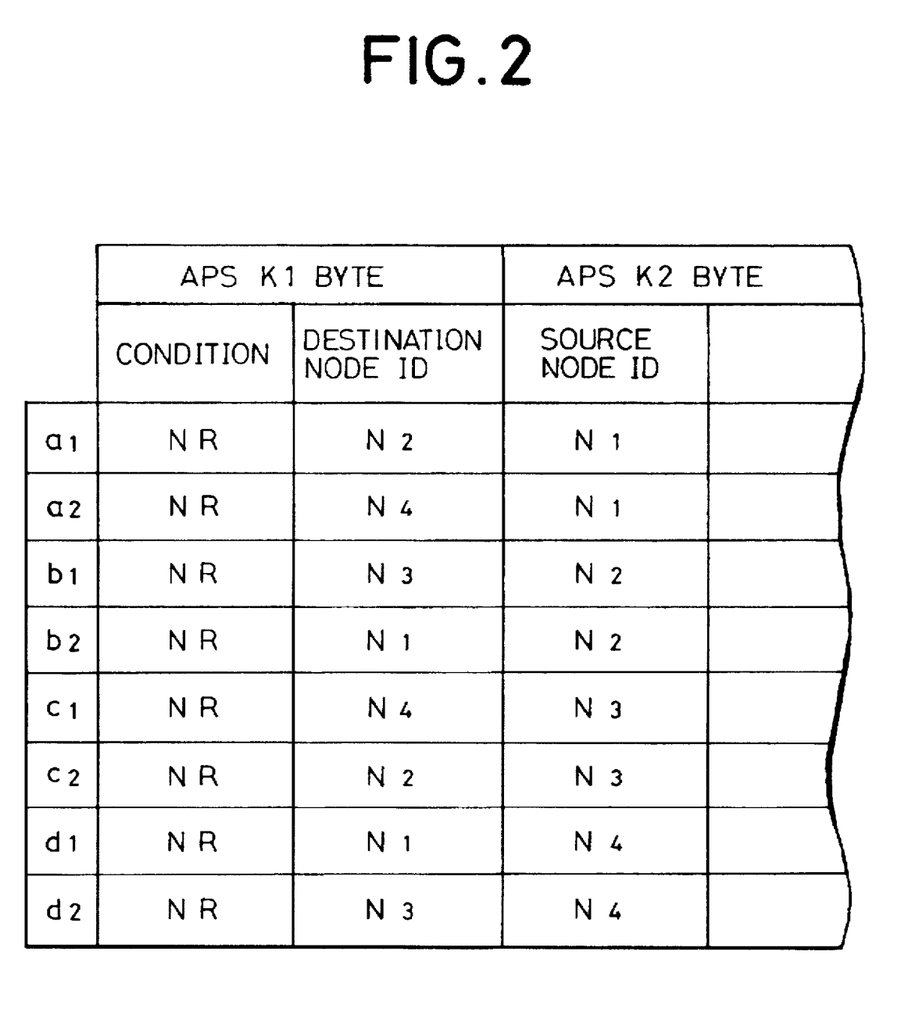
FIG. 2 is an illustration showing a content of transmitting APS bytes of each node in the block of FIG. 1.

In the APS protocol for main signal recovery, two bytes, i.e. K1 and K2 called as APS bytes are employed. The contents of these K1 and K2 bytes for each node in the normal condition, are as shown in FIG. 2. K1 byte is consisted of "CONDITION" (indicative of a function of Request level) and "DESTINATION NODE ID" (indicative of ID of a node facing and adjacent to own node in the direction CW or CCW), and K2 byte is consisted of "SOURCE NODE ID" (indicative of ID of own node).

Figure 3:
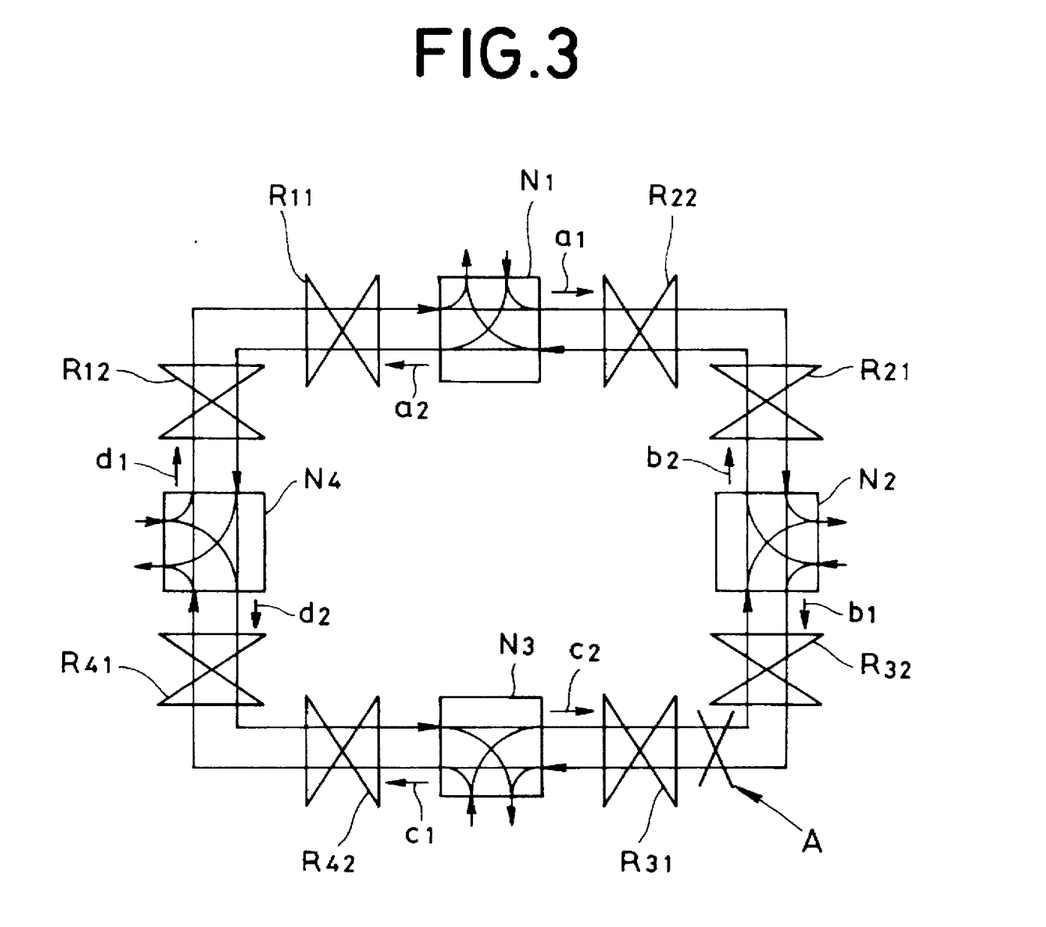
FIG. 3 is an illustration showing a failure point on the ring network system in the embodiment of the present invention.
Figure 4:
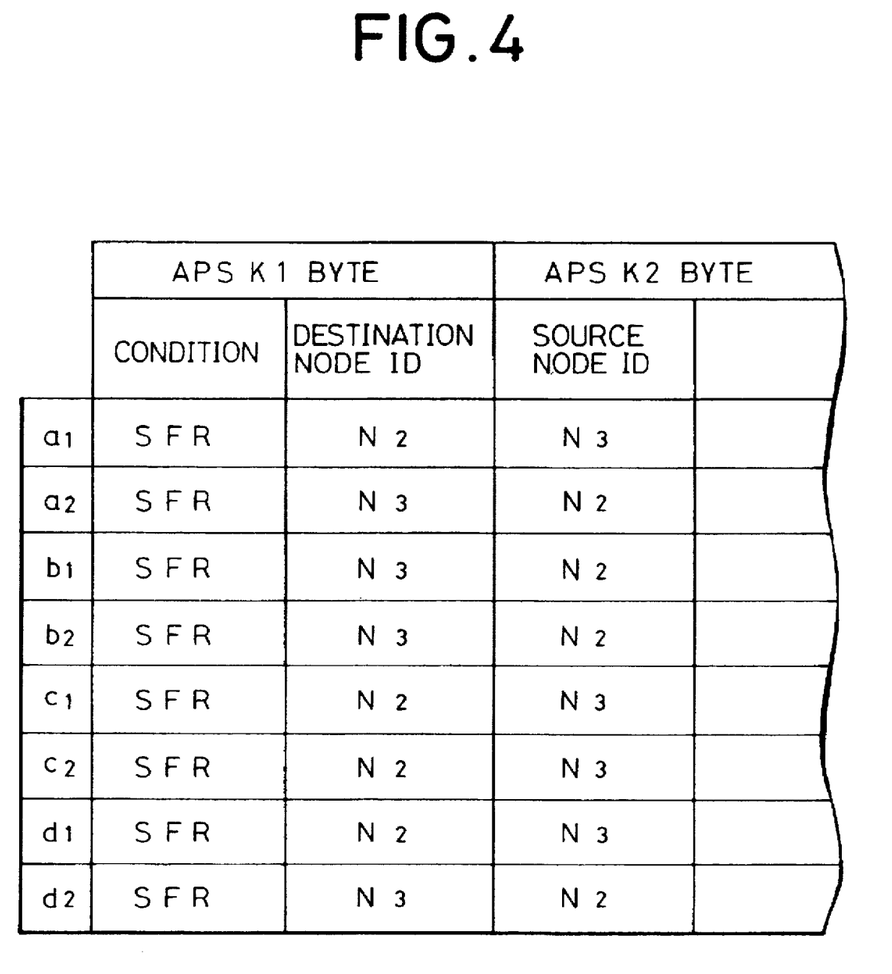
FIG. 4 is an illustration showing a content of the transmitting APS bytes of each node in the block of FIG. 3.
Figure 5:
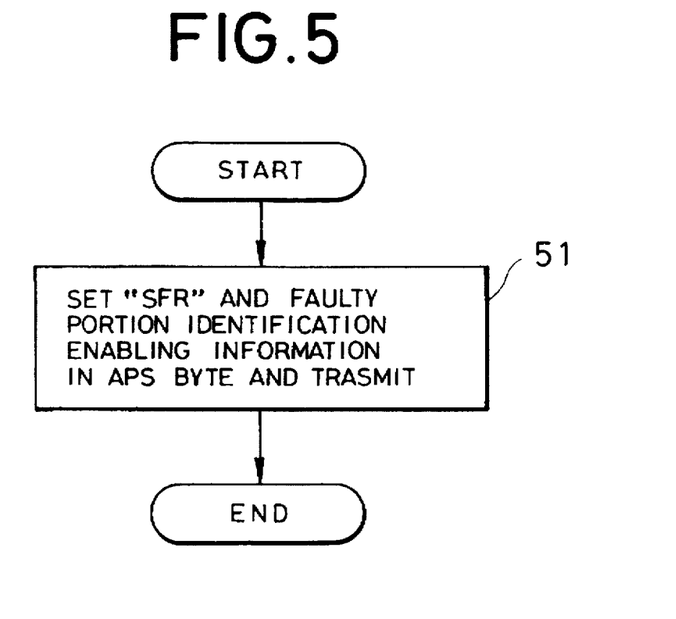
FIG. 5 is an operational flowchart of a failure detecting node.

As shown in FIG. 3, when failure is caused at the point A on the ring network, the nodes N2 and N3 can detect disconnection of the main signal. As shown by the flowchart of FIG. 5, these failure detecting nodes N2 and N3 insert "SFR" (Signal Failure Ring) in the location of "CONDITION" of the K1 byte of APS protocol. At the same time, an identification enabling information which can identify the location between the nodes (N2–N3) where the failure is caused is set in "DESTINATION NODE ID" and "SOURCE NODE ID" of the K1 byte and the K2 byte, as "N2" and "N3". Then, as shown in FIG. 4, the APS protocol are transmitted (step 51).

Figure 6:
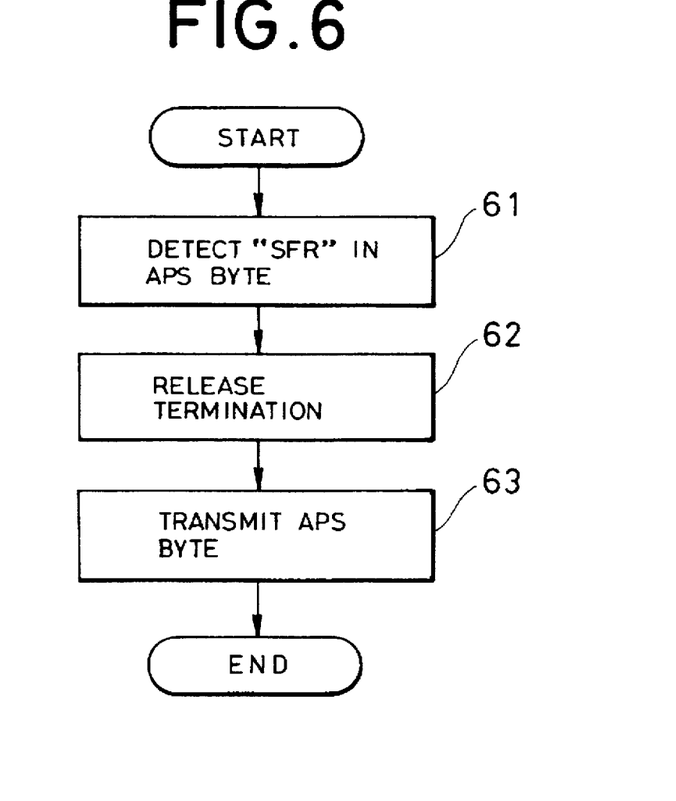
FIG. 6 is an operational flowchart of a node which terminates the order wire communication path in an initial state before occurrence of failure.

As shown in the flowchart of FIG. 6, the termination node N1 is responsive to the APS bytes b2 in the counterclockwise direction CCW from the node N2 (step 61) to release termination T1 upon detecting the condition "SFR"indicative the presence of a failure (step 62). This "SFR" is set at higher Request level than "NR" indicative of no failure transmitted from own node. Therefore, all of APS byte a2 of own node are overwritten by the APS bytes b2 received from the node N2, and then transmitted to the node N4 (step 63).

Also, at the node N4, all of the APS byte d2 of the counterclockwise direction CCW are overwritten by the content of the APS byte received from the preceding node. It should be noted that the APS bytes c2 of the node N3 are not overwritten since the node N3 is the node where the faulty point is detected. As a result, respective APS bytes a2, b2, c2 and d2 in the counterclockwise direction CCW become as shown in FIG. 4. It is similar with respect to respective APS bytes a1, b1, c1 and d1 and become as illustrated in FIG. 4 (APS bytes b1 of the node N2 are not overwritten similarly to the APS bytes c2 of the node N3).

Then, the node N3 (node having a supervisory range containing N3 and all of line repeaters between nodes N2 and N3 including the point A) as the closest node in the clockwise direction CW as viewed from the faulty point A performs checking to determine whether communication is possible or not sequentially from the closest line repeater from N3, and whether remote operation is possible or not, in response to the change from "NR" to "SFR" in "CONDITION" of the APS byte.

Figure 7:
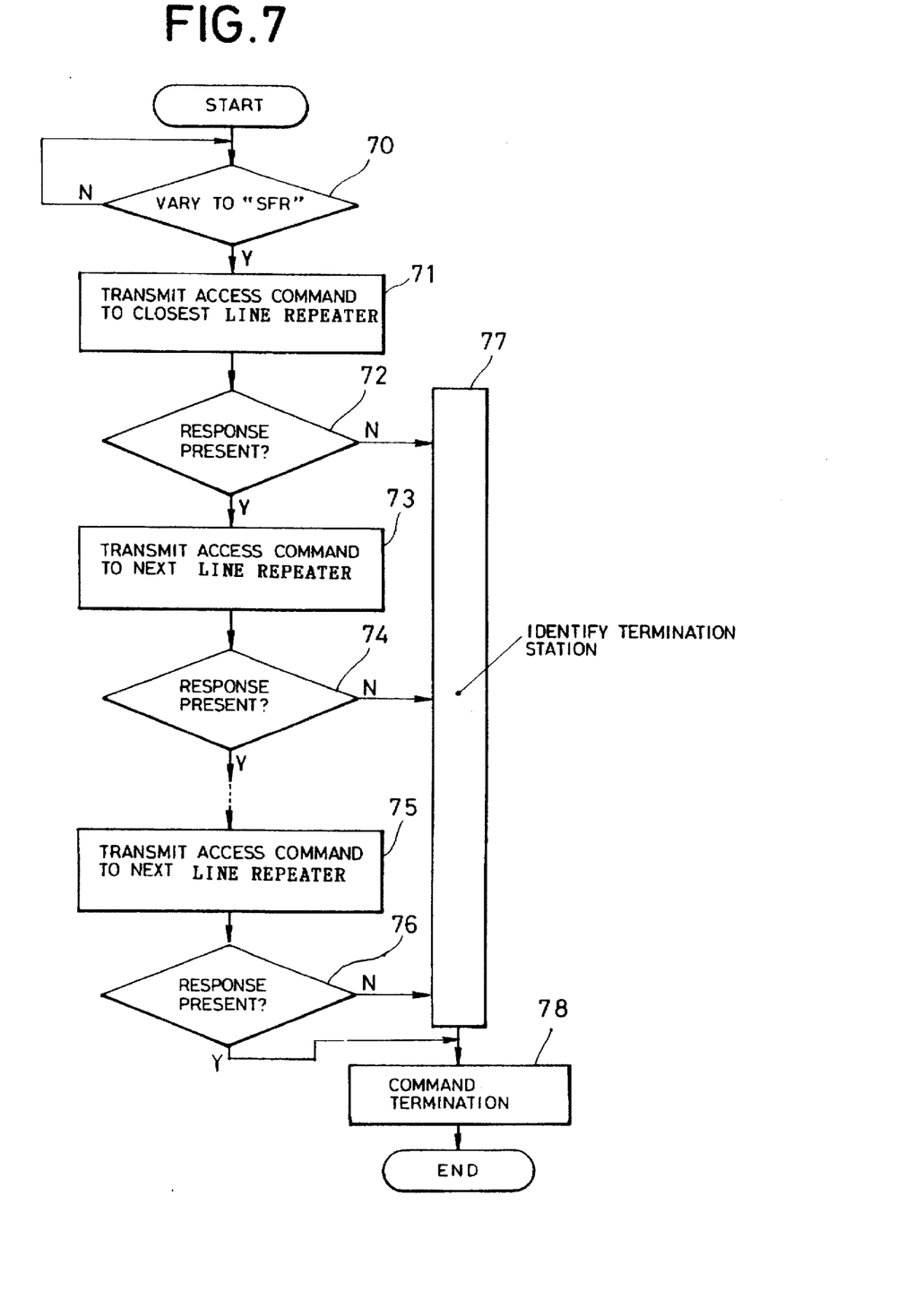
FIG. 7 is an operational flowchart for terminating remote control of the failure detecting node.

The operation in this case is illustrated in FIG. 7. When the APS byte changes to "SFR" (step 70), an access command is sent to the closest line repeater among line repeaters in the CCW direction under control of its own node (step 71). After a given period, a check is performed to determine whether the response to the access command is detected or not (step 72). If the response is present, it can be regarded that the line repeater in question is closer to the own node than the faulty point A. Then, the access command is transmitted to the next line repeater (step 73). Then, check is performed whether a response to the access command is returned (step 74). If the response is present, the access command is transmitted to the next line repeater.

By repeating the procedure set forth above (steps 75 and 76), at a time where response is not detected, the line repeater more nearly positioned by one stage to the node N3 than the line repeater in question is identified as the termination station (step 77). Then, to the line repeater identified as the termination station, a command for designation of termination is transmitted (step 78). Then, termination process by remote operation at the line repeater identified as the termination station is performed.

Figure 8:
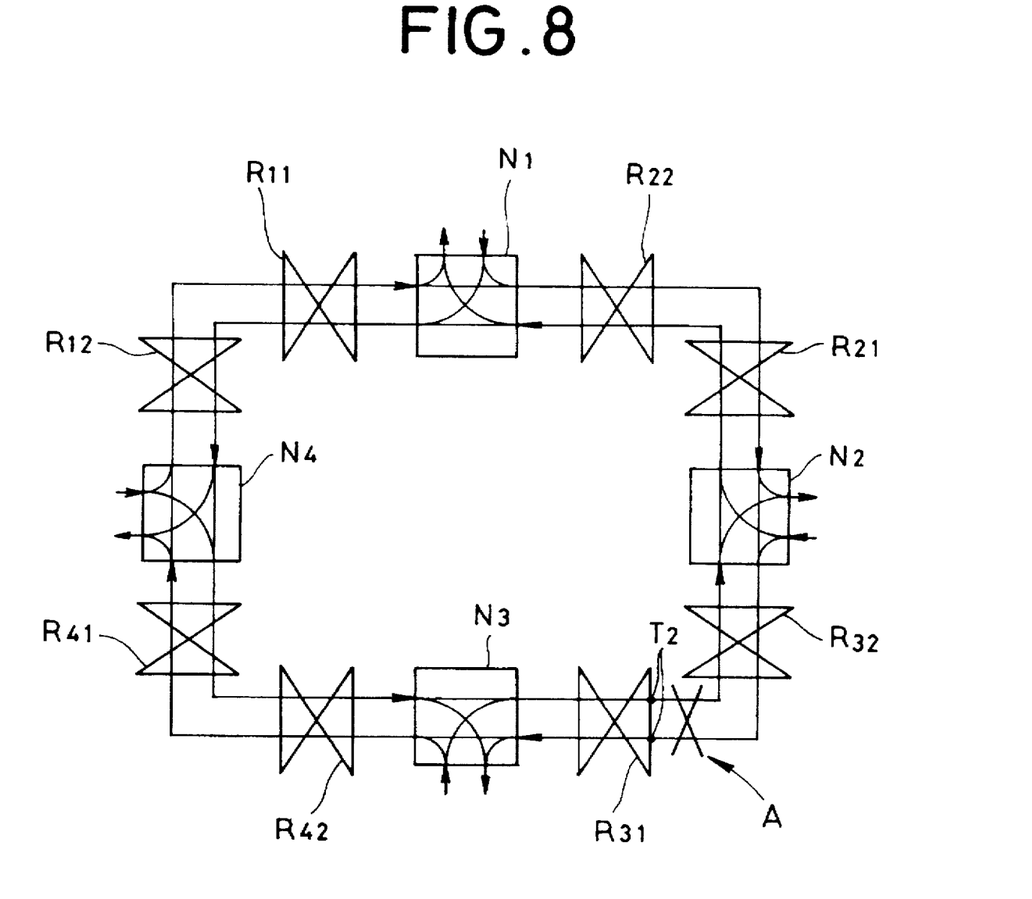
FIG. 8 is a block diagram of the final ring network system.

As a result, as shown in FIG. 8, termination T2 in the counterclockwise side CCW is performed at the line repeater R31. Thus, it becomes unnecessary to perform order wire communication control at the time of recovery of the communication line failure, at all. At this time, the termination point is transferred from the line repeater R31 to the node N3 which controls the line repeater R31.

Figure 9:
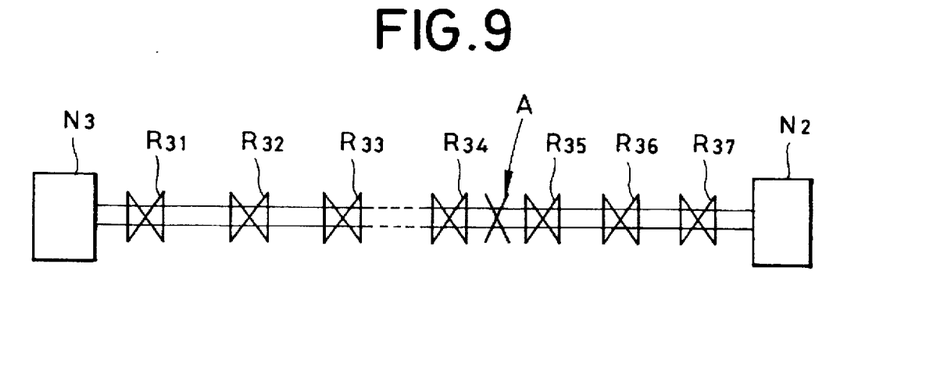
FIG. 9 is an illustration showing an example of arrangement of line repeaters between the failure detecting nodes N2, N3.
Figure 10A:
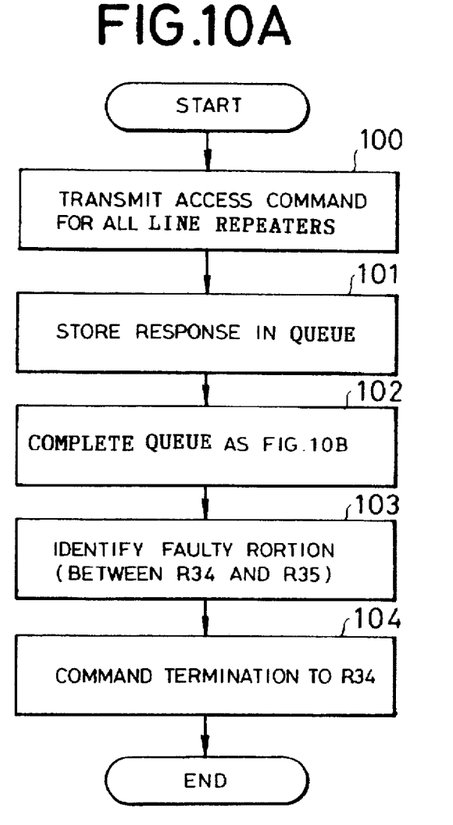
FIG. 10A is another flowchart for terminating remote control of the failure detecting node.

In the operation shown in FIG. 7, the access command is transmitted in order for respective line repeaters under management of the node N3, sequentially and node N3 waits for responses from respective line repeaters. When the number of line repeaters under control is increased from R31 to R37, as shown in FIG. 9, it takes a longer period to process the responses. Then, the operation as shown in FIG. 10A can be considered.

Figure 10B:
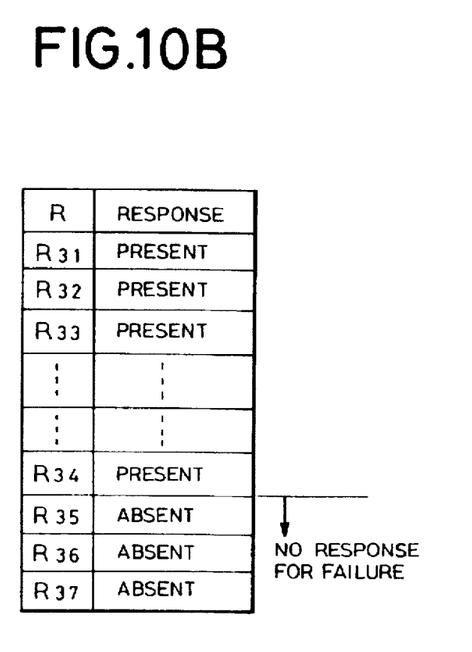
FIG. 10B is an illustration showing one example of a response queue.

By transmitting the access command to all of the line repeaters R31 through R37 under control of the node N3 (step 100), the responses are received from respective line repeaters. Then, the presence and absence of the response is respectively stored in a response queue (see FIG. 10B) (step 101). Then, the response queue is completed (step 102).

With making reference to the condition of the presence and absence of the response in the response queue, judgement can be made simply that the faulty point A is present between the line repeaters R34 and R35 (step 103). Thus, a command for termination with respect to the line repeater R34 is generated (step 104).

As set forth above, according to the present invention, upon performing recovery control of the order wire communication, even when a large number of line repeaters exists between respective nodes, appropriate terminating control can be performed automatically.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodiments within a scope encompassed and equivalents thereof with respect to the feature set out in the appended claims.

What is claimed is:

1. An order wire communication control method in a ring network system including a plurality of line terminal ends, a plurality of line repeaters respectively provided between the line terminal ends, a pair of communication lines connecting said line terminal ends and the line repeaters in a ring form for bidirectional data communication, and a pair of bidirectional order wires individually associated with said pair of communication lines and having a termination point at one line terminal end for order communication between the line terminal ends, comprising:

a first step of transmitting failure occurrence information indicative of an occurrence of a failure, utilizing an automatic protective switching protocol from two adjacent line terminal ends at both sides of a location where said failure is caused, in response to said occurrence of a failure at a faulty location on the ring network, via one of said bidirectional order wires;

a second step of automatically releasing said termination point of said bidirectional order wire in response to reception of said failure occurrence information in said one line terminal end; and a third step of automatically designating a new termination point of said bidirectional order wire at a line repeater positioned at a closest position to the faulty location from one of first and second line terminal ends adjacent the faulty location.

2. An order wire communication control method as set froth in claim 1, wherein, in said first step, said first and second line terminal ends trigger said automatic protective switching protocol in response to said occurrence of a failure to set said failure occurrence information in APS bytes used in said automatic protective switching protocol for transmission.

3. An order wire communication control method as set forth in claim 2, wherein each of said plurality of line terminal ends includes a step of transmitting the APS bytes received from a preceding stage of line terminal end to a next stage of line terminal end.

4. An order wire communication control method as set forth in claim 3, wherein said first line terminal end controls a plurality of line repeaters located between said first and second line terminal ends, wherein in said third step, said first line terminal end transmits a command designating said new termination point of the bidirectional order wire at a closest one of the line repeaters with respect to the faulty location among the line repeaters under control.

5. An order wire communication control method as set forth in claim 4, wherein said third step further comprises:

a step for sequentially transmitting an access command from said first line terminal end for a plurality of line repeaters under control in order from the closest one of the line repeaters, a step for detecting a response to said access command from said line repeaters, and a step for detecting the line repeater located at the closest location with respect to said faulty location depending upon presence and absence of the response.

6. An order wire communication control method as set forth in claim 5, wherein, in said step for detecting the line repeater, the line repeater immediately preceding to the line repeater for which the absence of the response is detected is identified as the closest line repeater to the faulty location.

7. An order wire communication control method as set forth in claim 5, further comprising a step for registering the presence and absence of the response in a response queue in order, corresponding to the line repeaters, and wherein in said step for detecting the line repeater, one of the line repeaters is identified as the line repeater closest to the faulty location.

8. An order wiring communication control method as set forth in claim 7, wherein the line repeater corresponding to the stored data in the response queue immediately preceding a variation in the stored data from that indicative of presence of the response to that indicative of absence of the response, is identified as the line repeater closest to the faulty location.

* * * * *